N. G. BEGLE.
THREAD GAGE.
APPLICATION FILED MAR. 11, 1916.
1,289,089.
Patented Dec. 31, 1918.
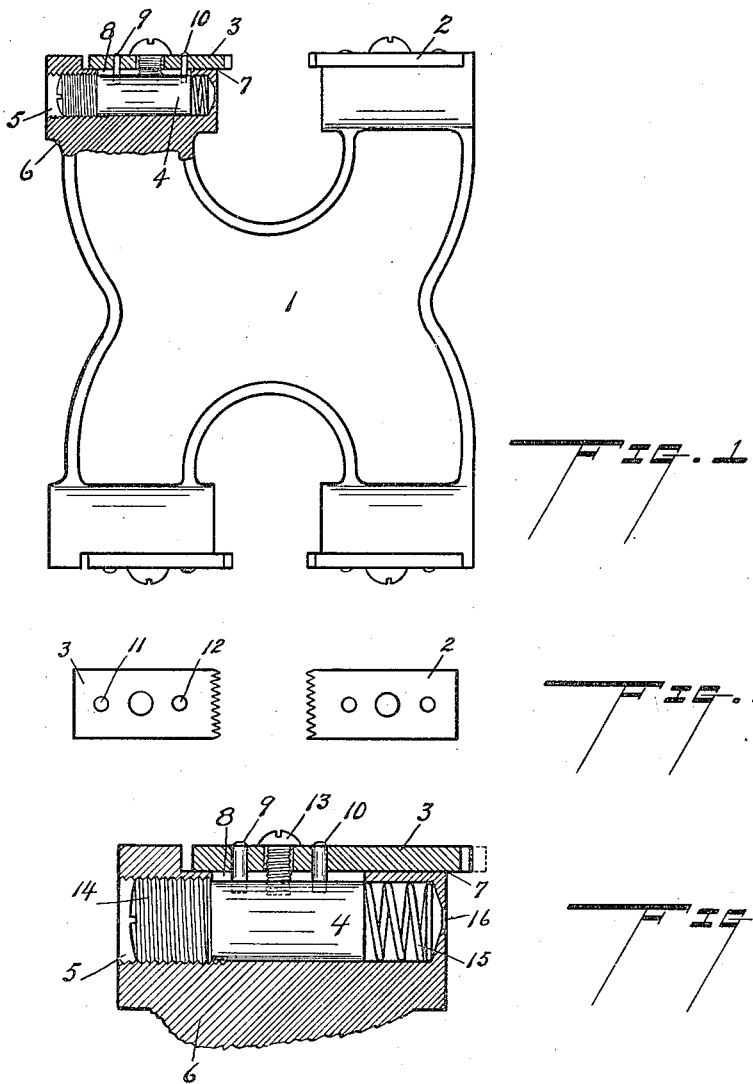
Ned G. Begle
INVENTOR
BY
Geo. B. Willcox
ATTORNEY

UNITED STATES PATENT OFFICE.

NED G. BEGLE, OF SAGINAW, MICHIGAN.

THREAD-GAGE.

1,289,089.  Specification of Letters Patent.  Patented Dec. 31, 1918.

Application filed March 11, 1916. Serial No. 83,529.

*To all whom it may concern:*

Be it known that I, NED G. BEGLE, a citizen of the United States, residing at Saginaw, in the county of Saginaw and State of Michigan, have invented certain new and useful Improvements in Thread-Gages; and I do hereby declare the following to be a full, clear, and exact description of the invention, such as will enable others skilled in the art to which it appertains to make and use the same.

This invention is a thread gage for use in gaging the shape, size and pitch of screw threads formed on bolts, rods, pipes, etc.

The objects of my present improvement are to provide a simple, convenient and accurate means for properly adjusting the gage to its correct or standard position and for readjusting it to its standard position if it gets out of adjustment either through wear or any other cause, and to construct and mount the gage plates on the frame so that new gage plates can be easily and quickly substituted in place of plates that have become worn.

With these and certain other objects in view which will appear later in the specification my invention consists of the devices described and claimed and the equivalents thereof.

In the drawings, Figure 1 is a part sectional side view of a gage with my improvement attached.

Fig. 2 is a plan view of two of the thread gage plates.

Fig. 3 is an enlarged sectional view of the plate-adjusting device.

As is clearly shown in the drawings, the gage consists of a frame 1, which may be of any suitable or usual construction, carrying the gage plates 2 and 3. One of these plates, as 2, is stationary on the frame 1 and the other plate 3 has a limited movement of adjustment toward and from the plate 2.

The adjusting means which forms the subject of my present improvement consists in a longitudinally movable plunger 4 received in the bore 5 of one of the jaws 6 of frame 1. The bore 5 is located close to the face 7 of the jaw 6, this face being accurately surfaced to receive the plate 3. A longitudinal slot 8 extending from the face 7 into the bore, loosely receives two guide-pins 9 and 10, which are firmly fixed to the plunger 4 and have a limited movement of travel along the slot 8. The plate 3 is formed with holes 11 and 12 to receive the pins 9 and 10, and a hole 10ᵃ to loosely receive a binding screw 13, the end of which is threaded into the plunger 4. Thus, tightening the binding screw, clamps the plunger immovably in the bore 5 and clamps the plate 3 to the face 7. When the screw 13 is loosened the plunger and the plate may be moved longitudinally to any desired adjusted position toward or from the plate 2, as indicated by the dotted lines in Fig. 3.

Adjustment toward the plate 2 may be effected by means of a threaded adjusting screw or stop 14 received in the threaded end of the bore 5, or adjustment away from plate 2, which has usually been accomplished by forcing the plate 3 and plunger 4 backward, after retracting the adjusting screw 14, is in my present improvement accomplished automatically by means of a compression spring 15 received in the end of the bore 5. This compression spring keeps the plunger 4 in contact with the adjusting screw 14 and to retract the plate it is only necessary to unscrew 14 partially to permit the plate 3 to withdraw beyond its desired adjusted position and then tighten screw 13 to clamp the plate in its desired position. An opening 16 extending from the face of the jaw 6 into the bore 5 may be left if desired, for the insertion of a tool to drive the plunger 4 back by hand in case of necessity.

By the means above described I have produced a thread gage of simple and inexpensive construction, that is accurate and reliable and capable of being adjusted to compensate for wear or similar conditions and that can be easily and quickly renewed by substituting new plates.

Having thus described my invention, what I claim and desire to secure by Letters Patent is:

In a gage of the class described, the combination with a frame, jaws thereon, a flat notched gage plate on each jaw, each plate formed with a central hole and two dowel pin holes, a longitudinally movable plunger, carried by each jaw, a pair of dowel pins secured to said plunger and received in the dowel pin holes of the plates, a set screw threaded into said plunger and passing through said central hole and adapted to clamp said plunger to said plate, an adjusting screw threaded into said jaw and bearing against one end of said plunger, and a compression spring at the opposite end of said plunger, for the purposes set forth.

In testimony whereof, I affix my signature in presence of two witnesses.

NED G. BEGLE.

Witnesses:
 NELLIE M. ANGUS,
 ROY WALLIS.